(12) United States Patent
Keech

(10) Patent No.: US 7,748,937 B2
(45) Date of Patent: Jul. 6, 2010

(54) COMPOSITE MATRIX FASTENER APPARATUS, SYSTEM AND METHOD

(75) Inventor: Nancy Kay Keech, Ladera Ranch, CA (US)

(73) Assignee: Southco, Inc., Concordville, PA (US)

( * ) Notice: Subject to any disclaimer, the term of this patent is extended or adjusted under 35 U.S.C. 154(b) by 881 days.

(21) Appl. No.: 11/038,878

(22) Filed: Jan. 20, 2005

(65) Prior Publication Data

US 2005/0186051 A1    Aug. 25, 2005

Related U.S. Application Data

(60) Provisional application No. 60/537,556, filed on Jan. 20, 2004.

(51) Int. Cl.
  *F16B 39/02*    (2006.01)
  *E04B 1/38*    (2006.01)
  *E21D 20/00*    (2006.01)
  *E21D 5/00*    (2006.01)

(52) U.S. Cl. .................. 411/82; 405/259.5; 405/233; 52/698; 52/704

(58) Field of Classification Search .......... 411/82–82.3; 405/259.5, 233; 52/698, 704
See application file for complete search history.

(56) References Cited

U.S. PATENT DOCUMENTS

| | | | | |
|---|---|---|---|---|
| 3,703,790 A | * | 11/1972 | Mattes et al. | 52/98 |
| 4,620,406 A | * | 11/1986 | Hugel et al. | 52/704 |
| 4,712,957 A | * | 12/1987 | Edwards et al. | 411/82.1 |
| 4,787,186 A | * | 11/1988 | Irmscher et al. | 52/309.3 |
| 4,836,729 A | * | 6/1989 | Bisping et al. | 411/82.1 |
| 4,968,185 A | * | 11/1990 | Leibhard et al. | 405/259.5 |
| 5,104,266 A | * | 4/1992 | Daryoush et al. | 405/259.5 |
| 5,562,377 A | * | 10/1996 | Giannuzzi et al. | 411/82 |
| 5,669,199 A | * | 9/1997 | Ludwig et al. | 52/704 |
| 5,888,334 A | * | 3/1999 | Abraham | 156/293 |
| 6,837,018 B1 | * | 1/2005 | Hagel et al. | 52/698 |

* cited by examiner

*Primary Examiner*—Victor Batson
*Assistant Examiner*—David Reese
(74) *Attorney, Agent, or Firm*—Paul & Paul

(57) ABSTRACT

A fastener system for connecting a first member to a second member is described. The fastener system includes a flexible shell having therein a flexible reinforcement member in the form of a frame. The shell and frame can be placed through holes in the two members and filled with a filler material that hardens to form a rigid fastener in order to connect the first and second members together. The fastener system and method can be used even when the holes in the two members are misaligned or are of different sizes.

4 Claims, 3 Drawing Sheets

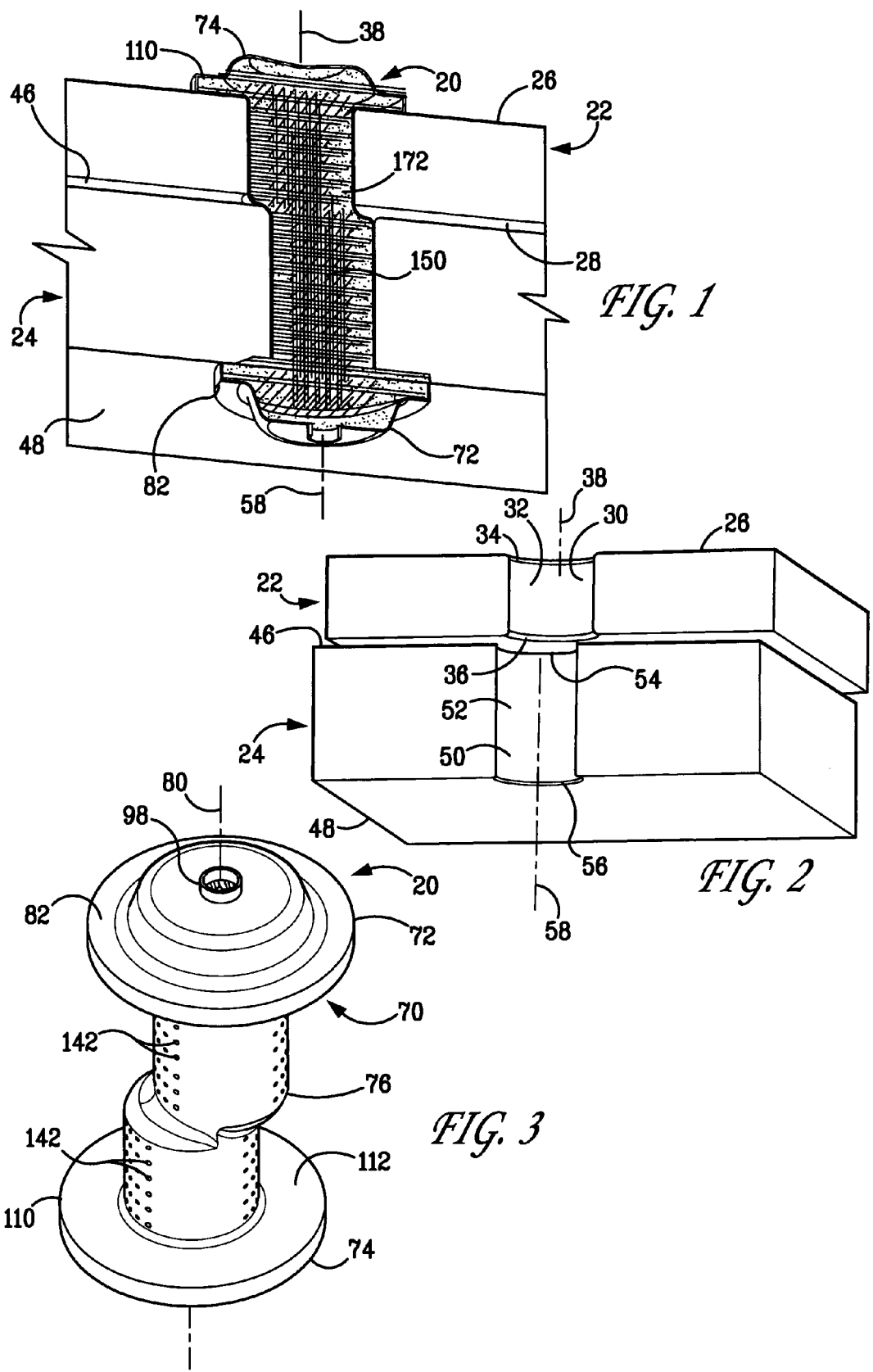

COMPOSITE MATRIX FASTENER APPARATUS, SYSTEM AND METHOD

CROSS REFERENCE TO RELATED APPLICATIONS

This application claims the benefit of the priority of U.S. Provisional Application for Patent No. 60/537,556, filed on Jan. 20, 2004, the entire disclosure of which is incorporated herein by reference.

BACKGROUND

The present disclosure relates to a fastener assembly, system and method adapted to connect a first member to a second member, and in particular to a fastener having a hollow shell adapted to be inserted through an aperture and that is adapted to be subsequently filled with a filler material, such that the shell and filler material conform to and fill the apertures to create a connection between the first and second members.

By way of example but not limitation, in the construction of aircraft, such as airplanes and helicopters, and of other products, a first member having a first aperture is often required to be attached to a second member having a second aperture. Rigid metallic fasteners such as rivets and bolts have often been used to connect a first member to a second member. Rigid metallic fasteners do not compensate for misalignment of the aperture in the first member with the second aperture in the second member. In addition, when metallic fasteners are used in connection with aircraft and other products that are intended to avoid detection by electronic detection devices such as radar, the metallic fasteners may provide a detectable radar signature, although other components of the aircraft or other product may be made from materials that absorb radar emissions or that provide minimal radar detection.

BRIEF DESCRIPTION OF THE DRAWING FIGURES

FIG. 1 is a cross sectional view of an embodiment of the disclosed fastener assembly shown connecting a first member to a second member.

FIG. 2 is a cross sectional view of the first member and of the second member shown with their respective apertures in misalignment.

FIG. 3 is a perspective view of the disclosed fastener assembly removed from the misaligned members shown with the shank of the fastener in a misaligned position.

DETAILED DESCRIPTION

Figure 4:
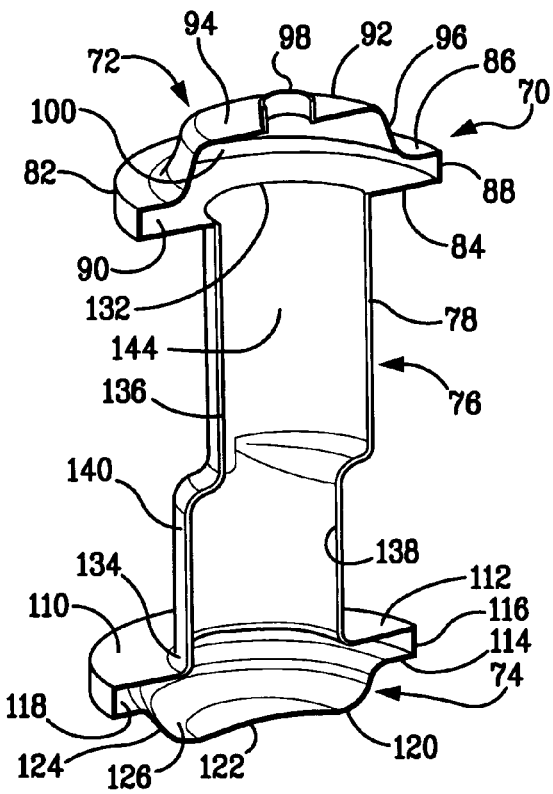
FIG. 4 is a cross sectional view of the envelope or shell of the fastener shown in FIG. 3.

A fastener assembly 20 as shown in the drawing figures is adapted to attach or connect a first member 22 to a second member 24. The first member 22 includes a first surface 26 and a spaced apart second surface 28. The first member 22 includes an aperture 30 that extends through the first member 22 from the first surface 26 to the second surface 28. The aperture 30 forms a generally cylindrical peripheral side wall 32 having a generally circular peripheral first edge 34 located at the first surface 26 and a generally circular peripheral second edge 36 located at the second surface 28. The aperture 30 includes a linear central axis 38. The second member 24 includes a first surface 46 and a spaced apart second surface 48. The first surface 46 of the second member 24 is adapted to engage the second surface 28 of the first member 22. The second member 24 includes an aperture 50 that extends from the first surface 46 to the second surface 48. The aperture 50 includes a generally cylindrical peripheral side wall 52. The side wall 52 includes a generally circular peripheral first edge 54 located at the first surface 46 and a generally circular peripheral second edge 56 located at the second surface 48. The aperture 50 includes a generally linear central axis 58.

Figure 6:
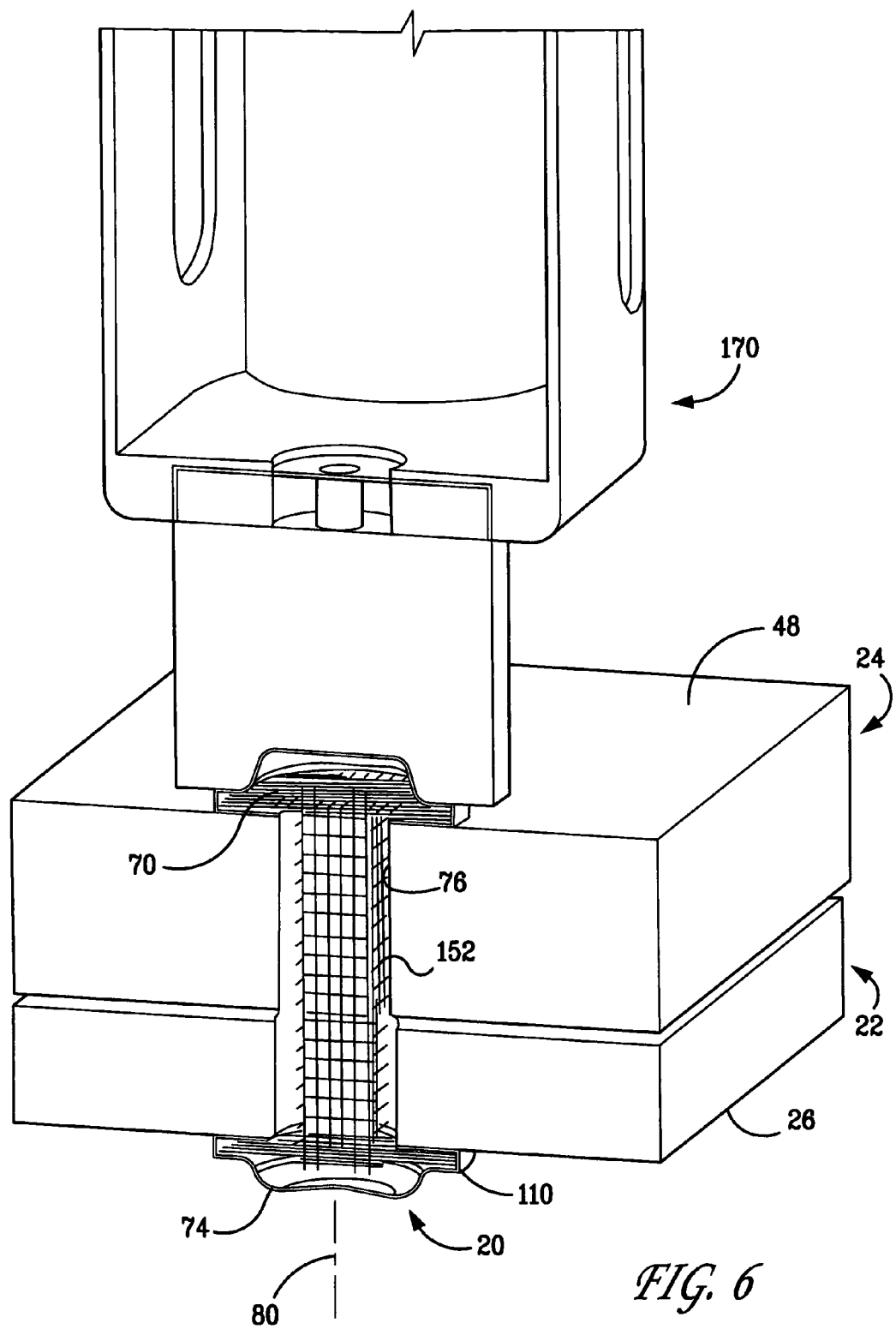
FIG. 6 is a cross sectional view of the fastener extending through a first member and a second member and shown with an injection device for filling the fastener with a filler material.

The first member 22 and second member 24 are intended to be broadly interpreted and may include, but are not limited to, a plate, panel, wall, bracket or other structure or shape. The surfaces 26, 28, 46 and 48 may be generally planar or curved. The first and second members 22 and 24 may be formed from non-metallic materials such as composite materials. If desired, the first and second members 22 and 24 may also be made from metallic materials such as steel, stainless steel, aluminum, titanium and the like. Each aperture 30 and 50 may be generally circular or cylindrical as shown in FIGS. 1 and 2. Each aperture 30 and 50 may also be formed in other configurations such as square, hexagonal and other polygonal shapes, or as elongate slots. In addition, one of the apertures 30 or 50 may be larger in size or diameter than the other aperture. The first and second apertures 30 and 50 may be aligned with one another as shown in FIG. 6, wherein the central axis 38 of the aperture 30 and the central axis 58 of the aperture 50 are coaxial with one another. As shown in FIGS. 1 and 2, the apertures 30 and 50 may be offset or misaligned with one another such that their respective central axes 38 and 58 are not coaxial with one another and are spaced apart from one another. The apertures 30, 50 may also be in the form of other shapes and contours whether intentionally designed or unintentionally occurring. For example, with regard to intentional configurations, it is envisioned that configurations may be employed which provide increased holding strength such as intentional offsets, threads, other engaging structures including recesses and extensions. As it will be described in greater detail below, it is envisioned that other configurations may be employed to increase the holding strength to the fastener assembly 20 in the apertures.

As shown in FIG. 4, the fastener assembly 20 includes an envelope or shell 70 having a generally hollow configuration. One embodiment of the shell is formed from a generally non-metallic flexible and resilient material. The shell 70 may be formed from an elastomeric material such as urethane. It is envisioned that a variety of materials may be used for the shell including but not limited to metallic, partially metallic, partially rigid as well as memory materials and metals. Reference to particular materials for the shell is provided for purpose of example only and should be broadly interpreted to contemplate any suitable material which can be used with the fastener assembly 20.

As shown in FIG. 1, the shell 70 includes a first head 72, a second head 74 and a shank 76 that extends between the first head 72 and the second head 74. The shell 70 includes a hollow chamber 78 and a central longitudinal axis 80. The first head 72 is located at a first end of the fastener 20 and the second head 74 is located at a second end of the fastener 20. It is envisioned that while the heads 72, 74 may be embodied in different shapes, for example, but not by way of limitation, enlargements in the shell 70. Additionally, it is envisioned that in some situations only a single head may be used or no head at all with the shell forming a generally continuous body with little or no enlargement providing a head. As such, it is envisioned that the interpretations of the fastener assembly 20 be broadly construed.

In the embodiment shown in the Figures, the first head 72 of the shell 70 includes a generally circular flange 82 having a generally planar and annular first wall 84, and a generally planar and annular second wall 86 that is spaced apart and generally parallel to the annular first wall 84. The annular walls 84 and 86 are located generally concentrically about the central axis 80. The first head 72 includes a generally cylindrical peripheral side wall 88 that extends generally concentrically about the central axis 80 and that extends between the outer circular edges of the first and second annular walls 84 and 86. The flange 82 includes a hollow flange cavity 90 that forms a portion of the chamber 78. The first head 72 also includes a cap 92 that is attached to the inner circular edge of the annular second wall 86 of the flange 82. The cap 92 includes a generally planar and circular end wall 94 that is located generally concentrically about and perpendicular to the central axis 80 and that is spaced apart from and generally parallel to the annular second wall 86 of the flange 82. The cap 92 includes an inclined conical shaped peripheral side wall 96 that extends between the inner circular edge of the annular second wall 86 of the flange 82 and the circular peripheral edge of the end wall 94. The end wall 94 includes a central aperture 98 that is located along the axis 80 and that is in fluid communication with the chamber 78. The cap 92 includes a hollow cap cavity 100 that forms a portion of the chamber 78.

The second head 74 of the shell 70 includes a generally circular flange 110 having a generally planar and annular first wall 112 and a generally planar and annular second wall 114 that is spaced apart from and generally parallel to the annular first wall 112. The annular walls 112 and 114 are located generally concentrically about and perpendicular to the central axis 80. The second head 74 includes a generally cylindrical peripheral side wall 116 that extends generally concentrically about the central axis 80 and that extends between the outer circular edges of the first and second annular walls 112 and 114. The flange 110 includes a hollow flange cavity 118 that forms a portion of the chamber 78. The second head 74 also includes a cap 120 that is attached to the inner circular edge of the annular second wall 114 of the flange 110. The cap 120 includes a generally planar and circular end wall 122 that is located generally concentrically about and perpendicular to the central axis 80 and that is spaced apart from and generally parallel to the annular second wall 114 of the flange 110. The cap 120 also includes an inclined conical shaped peripheral side wall 124 that extends between the inner circular edge of the annular second wall 114 of the flange 110 and the circular peripheral edge of the end wall 122. The cap 120 includes a hollow cap cavity 126 that forms a portion of the chamber 78.

The shank 76 of the shell 70 includes a first end 132 attached to the inner peripheral edge of the annular first wall 84 of the first head 72, and a second end 134 attached to the inner peripheral edge of the annular first wall 112 of the second head 74. The shank 76 includes a generally cylindrical peripheral side wall 136 that extends generally concentrically about the axis 80. The side wall 136 includes an internal surface 138 and an external surface 140. The side wall 136 includes a plurality of apertures 142 that are located along the length of the shank 76 between the first end 132 and the second end 134. The shank 76 includes a hollow shank cavity 144 that forms a portion of the chamber 78. It should be noted that while the shank 76 as shown in FIGS. 3 and 4 includes an upper portion that is offset from a lower portion, FIGS. 3 and 4 show the shank 76 in this deformed position to illustrate how the shank would be deformed and misaligned when the apertures 30 and 50 in the members 22 and 24 are misaligned as shown in FIGS. 1 and 2. Prior to insertion into the apertures 30 and 50 of the first and second members 22 and 24, the shank 76 may have a uniform configuration along the axis 80 between the first end 132 and second end 134.

Figure 5:
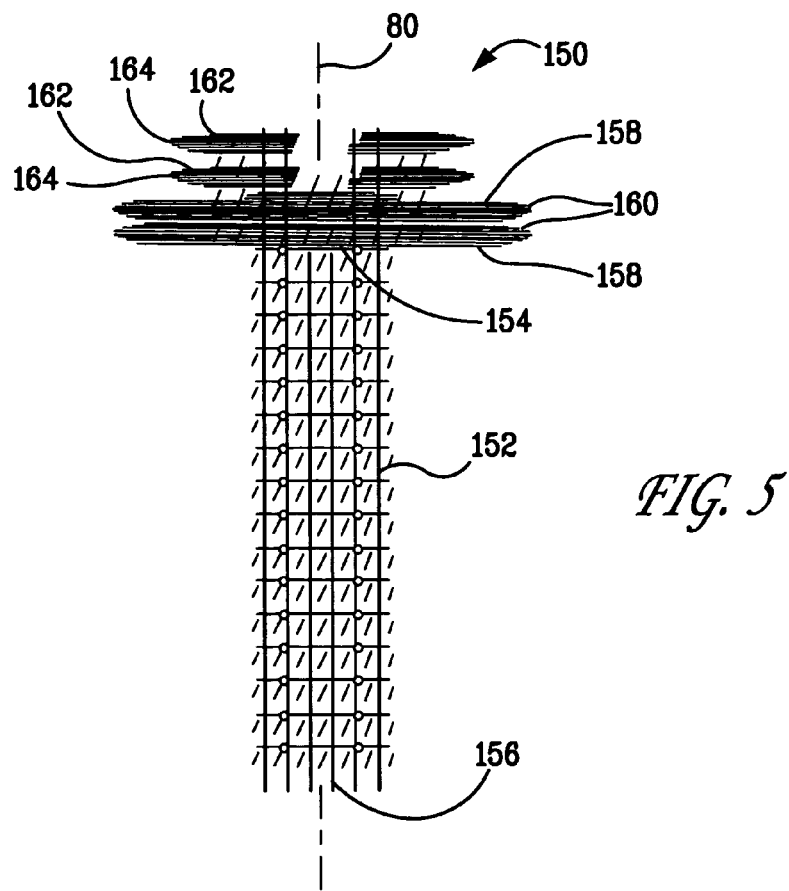
FIG. 5 is a side elevational view of the frame, matrix or reinforcement member of the fastener.

The fastener assembly 20 as shown also includes a reinforcement member in the form of a frame or matrix 150. As shown in FIGS. 1 and 6, the reinforcement member 150 is located within the chamber 78 of the shell 70 and is attached to the shell 70. The reinforcement member 150 includes an elongate generally cylindrical column 152 that extends along the central axis 80 between a first end 154 and a second end 156. The column 152 is adapted to be located within the shank cavity 144 of the shell 70. The outer periphery of the column 152 is attached to and embedded within the shank 76 of the shell 70. The reinforcement member 150 also includes one or more first generally disc-shaped members 158 attached to the first end 154 of the column 152. The disc-shaped members 158 are generally concentrically located on the axis 80 and extend generally radially outwardly perpendicular to the axis 80 to an outer generally circular edge 160. The reinforcement member 150 also includes one or more second generally disc-shaped members 162. Each second disc-shaped member 162 is located generally concentrically about the central axis 80 and extends radially outwardly generally perpendicular thereto to a generally circular edge 164. The first disc-shaped members 158 have a larger diameter than the second disc-shaped members 162. The first disc-shaped members 158 are adapted to be located within the flange cavity 90 of the flange 82. The second disc-shaped members 162 are adapted to be located within the cap cavity 100 of the cap 92. Although not shown in FIG. 5, the reinforcement member 150 may include one or more first disc-shaped members at the second end 156 of the column 152 that are adapted to be located within the flange cavity 118 of the flange 110, and one or more second disc-shaped members at the second end 156 of the column 152 that are adapted to be located within the cap cavity 126 of the cap 120.

The reinforcement member 150 is formed as a three-dimensional mesh, frame, lattice or matrix of fiber-like elements or threads. The threads may be formed from any suitable material including, but not limited to plastics, composites, as well as, non-metallic materials such as, for example, but not limited to glass, carbon, aramid, graphite and the like. In the embodiment as shown, the interweaving of the threads in the three dimensional matrix creates a plurality of hollow voids within the reinforcement member 150. The fibers that form the reinforcement member 150 are flexible such that the reinforcement member 150 itself is flexible.

The frame or reinforcement member 150 can take many different forms. For example, the frame 150 can be a flexible structure which is integrally formed as a single piece unit. The single piece unit can be provided in the shell 170 or may be inserted into the shell 170 after the shell is placed in a desired position in the work piece. Alternatively, the reinforcement member 150 can be provided in multiple pieces such that a first portion or disc-shaped member 158 is positioned in the shell 70 with the second generally disc-shaped member 162 carried on the column 152. This configuration might allow the shell 70 to be inserted through the openings yet retained on the one end by the disc-shaped member 162 retained in the shell 70. Subsequent attachment of the column and first disc-shaped member is achieved prior to final forming of the fastener assembly.

If desired, the flange cavity 118 of the flange 110 and the cap cavity 126 of the cap 120, may be filled with a non-metallic hardened filler material that forms a non-metallic plug, with the second end 156 of the reinforcement member 150 embedded in the plug, prior to inserting the fastener 20 into the apertures 30 and 50 of the members 22 and 24. The plug is adapted to provide a rigid member that can be pressed into engagement with the second surface 26 of the first member 22.

In operation, the first surface 46 of the second member 24 is placed in engagement with the second surface 28 of the first member 22 such that the aperture 50 of the second member 24 is in communication with the aperture 30 in the first member 22. The apertures 30 and 50 are preferably aligned with one another such that the respective axes 38 and 58 are coaxial with one another. However, as shown in FIGS. 1 and 2, the apertures 30 and 50 may be misaligned with one another.

The first head 72 of the shell 70 is flexibly collapsed and is inserted through the aperture 30 in the first member 22 and aperture 50 in the second member 24 until the flange 110 of the second head 74 engages the first surface 28 of the first member 22. The first head 72 expands after it exits the aperture 50 such that the flange 82 of the first head 72 engages the second surface 48 of the second member 24. The first member 22 and the second member 24 are then forcibly pressed into compressed engagement with one another.

An injection device 170 is then placed into engagement with the flange 182 of the first head 72 and is placed in communication with the aperture 98 in the cap 92 of the first head 72. The injection device 170 injects a non-metallic liquid filler material 172 through the aperture 98 in the cap 92 and into the chamber 78 of the shell 70. As the filler material 172 is injected into the chamber 78, air within the chamber 78 is vented out of the shell 70 through the apertures 142 in the shell 70. The liquid filler material 172 is injected into the chamber 78 until all of the voids within the reinforcement member 150 are filled, and the chamber 78 of the shell 70 is filled with the filler material 172. Thereafter, the filler material 172 sets and hardens and becomes a non-metallic rigid filler material. As the filler material 172 is injected into the chamber 78, the filler material 172 will deform the configuration of the reinforcement member 150 and shell 70 such that the shell 70 will completely fill the apertures 30 and 50 of the first and second members 22 and 24. The filler material 172 may comprise a resin material, such as an epoxy or vinyl ester.

The flexible shell 70 and the flexible reinforcement member 150 are adapted to deform and completely fill the apertures 30 and 50 of the first and second members 22 and 24, even if the apertures are misaligned with one another. The shell 70 has the ability to adapt to fill any configuration of an aperture in a balloon-like manner, wherein the shell 70 is adapted to conform to the shape of the surface that forms the aperture, such as the sidewalls 32 and 52. The three-dimensional matrix of fibers in the reinforcement member 150 extend in the X, Y, and Z directions in a three-dimensional coordinate system and provide the fastener 20 with strength in both shear and tension. The materials from which the shell 70, reinforcement member 150, and filler material 172 are formed can be selected to match the material properties of the first member 22 and second member 24, to provide stable dimensional properties and lower stresses in the connected assembly of the members 22 and 24 that would otherwise result due to the effect of temperature changes and thermal expansion. The fastener 20 may be made entirely from non-metallic material, such that the fastener 20 produces a very low or no radar reflection.

Various features of the invention have been particularly shown and described in connection with the illustrated embodiment of the invention, however, it must be understood that these particular arrangements merely illustrate the principles of the invention, and that the invention is to be given its fullest breadth within the terms of the appended claims.

The invention claimed is:

1. A method for connecting a first member to a second member, the first member having a first aperture and the second member having a second aperture, the method comprising the steps of:
   providing a shell having a hollow configuration so as to define a hollow chamber, the shell being formed from a flexible and resilient material, the shell including a first head, a second head, and a shank that extends between the first head and the second head;
   providing a reinforcement member in the form of a flexible frame having voids;
   positioning the reinforcement member within the hollow chamber;
   positioning the shell such that the first head and the second head are positioned at opposite sides of an assembly comprising the first member and the second member and the shank at least extends into both the first aperture and the second aperture;
   supplying filler material into the hollow chamber such that the filler material entirely fills the hollow chamber; and
   allowing the filler material to harden into a rigid filler material to thereby form a fastener extending at least into both the first aperture and the second aperture,
   wherein the shell is deformed such that the shell conforms to the first aperture and the second aperture, and wherein the shell and the filler material therein completely fill the first and second apertures, and
   wherein said step of positioning the shell comprises the steps of:
   inserting the first head through the first aperture and the second aperture;
   causing said first head to collapse during said step of inserting the first head through the first aperture and the second aperture; and
   allowing the first head to expand after the first head has passed through the first aperture and the second aperture.

2. The method according to claim 1, further comprising the steps of:
   providing a filling aperture and a plurality of vent apertures in the shell; and
   placing the flexible frame within the shell prior to said step of positioning the shell.

3. The method according to claim 2, wherein the shank, the first head, and the second head each have at least a hollow cavity that forms part of the hollow chamber.

4. The method according to claim 1, wherein the shank, the first head, and the second head each have at least a hollow cavity that forms part of the hollow chamber.

* * * * *